United States Patent [19]

Pusch

[11] 4,111,712

[45] Sep. 5, 1978

[54] HIGH DENSITY ASBESTOS-FREE TOBERMORITE THERMAL INSULATION CONTAINING WOLLASTONITE

[75] Inventor: Walter George Pusch, Westford, Mass.

[73] Assignee: Johns-Manville Corporation, Denver, Colo.

[21] Appl. No.: 873,199

[22] Filed: Jan. 30, 1978

[51] Int. Cl.$^2$ ............................................. C04B 43/02
[52] U.S. Cl. ................................................ 106/120
[58] Field of Search ........................................ 106/120

[56] References Cited

U.S. PATENT DOCUMENTS

| 3,001,882 | 9/1961 | Taylor | 106/120 |
| 3,116,158 | 12/1963 | Taylor | 106/120 |
| 3,317,643 | 5/1967 | Denny | 106/120 |
| 3,501,324 | 3/1970 | Kubo | 106/120 |
| 3,928,054 | 12/1975 | Kubo | 106/120 |

*Primary Examiner*—J. Poer
*Attorney, Agent, or Firm*—Robert M. Krone; Joseph J. Kelly; James W. McClain

[57] ABSTRACT

A high density thermal insulation material is described, consisting essentially of, in parts by weight, 15 to 35 parts of lime, 15 to 35 parts of silica or other siliceous material, 40 to 70 parts of wollastonite, and 1 to 10 parts of organic fiber, and where the wollastonite content is at least 40 percent by weight of the total weight of solids, all slurried in water, then compressed to a shape-retaining body of at least 20 pcf density and indurated to form an asbestos-free, wollastonite-reinforced, crack-resistant tobermorite calcium silicate hydrate matrix thermal insulation.

6 Claims, No Drawings

HIGH DENSITY ASBESTOS-FREE TOBERMORITE THERMAL INSULATION CONTAINING WOLLASTONITE

BACKGROUND OF THE INVENTION

The invention herein relates to thermal insulations. More particularly it relates to high density thermal insulations composed largely of calcium silicate hydrate.

Calcium silicate hydrate insulations have in the past been divided by industry practice into two groups: low density and high density. The low density or lightweight insulations generally have densities of less than 20 lb/cu. ft. ("pcf"; 0.3 g/cm$^3$). Such materials are used primarily as short length pipe coverings and blocks for tank insulations and the like. They have limited physical strength or impact resistance and must be used in settings where they will not be subjected to any physical impacts. In the past such lightweight materials were calcium silicate hydrates reinforced with asbestos fibers; a typical example of such materials is illustrated in U.S. Pat. No. 3,001,882. Subsequently asbestos-free calcium silicate hydrate lightweight insulations were developed, and typical examples are illustrated in U.S. Pat. Nos. 3,501,324 and 3,679,446. In most practical industrial uses the lightweight calcium silicate hydrate insulations have densities on the order of 9 to 15 pcf (0.14 to 0.22 g/cm$^3$); a typical example is an asbestos-free calcium silicate hydrate insulations with a density of about 11 pcf (0.18 g/cm$^3$) sold commercially by the Johns-Manville Corporation under the trademark THERMO-12.

Industry practice has heretofore defined high density calcium silicate hydrate insulations as those having densities of 20 pcf (0.3 g/cm$^3$) or higher; commonly these have densities of 35 to 65 pcf (0.56 to 1.04 g/cm$^3$). These high density materials offer not only good thermal insulation properties but also sufficient strength and durability such that they can be manufactured as large sheets and used for self-supporting walls, oven linings, ship bulkheads and the like. Unlike the low density materials, the high density insulations have good nailing, cutting and screw holding characteristics, such that they can be handled in a manner similar to many other construction materials. A high density material of this type which established a very significant place in the marketplace for many years was an asbestos reinforced calcium silicate hydrate board having densities ranging from 23 to 65 pcf (0.37 to 1.04 g/cm$^3$) and which was sold commercially by the Johns-Manville Corporation under the trademark MARINITE. Description of such high density calcium silicate hydrate insulations will be found in U.S. Pat. Nos. 2,326,516 and 2,326,517.

In addition, calcium silicate insulations have been classified on the basis of the crystalline structure of the calcium silicate hydrate which makes up the insulation matrix. References have shown that the crystalline structure of the insulation calcium silicate hydrates can be varied among tobermorite, xonotlite and mixtures thereof, depending on the reaction conditions involved. See, for instance, U.S. Pat. No. 3,501,324; Kalousek et al., *J.Am.Cer.Soc.*, 40, 7, 236–239 (July, 1957); and Flint et al, "Research Paper RP-1147," *J.Res.Natl.Bur.Stds.*, 21, 617–638 (November, 1938).

U.S. Pat. No. 3,116,158 to W. C. Taylor describes insulations having tobermorite, xonotlite or mixed matrices, and also containing wollastonite (fibrous anhydrous calcium silicate) as a reinforcing fiber. Taylor stresses, however, that if the matrix is tobermorite, wollastonite must be used sparingly and only as a limited partial substitute for asbestos. Taylor teaches that in order to prevent slurry settling and resultant poor products, the fibrous component in the tobermorite slurry must contain at least 40% by weight asbestos and in some cases must contain up to 85% by weight asbestos. With a xonotlite matrix, however, all the asbestos may be replaced by wollastonite. Taylor also teaches that the fibrous component (asbestos plus wollastonite) in a tobermorite matrix must not exceed 20% by weight of the total solids, so that the wollastonite content cannot exceed 12% by weight of the total solids. On the other hand, in a xonotlite matrix, as much as 50% by weight of the solids may be wollastonite. Similarly, U.S. Pat. No. 3,001,882 (also to Taylor) describes the addition of wollastonite to a xonotlite matrix as does U.S. Pat. No. 3,317,643. Other patents such as U.S. Pat. No. 3,238,052 and British Pat. No. 984,112, mention wollastonite in other crystalline phases of calcium silicate materials. Wollastonite as the matrix itself is disclosed in U.S. Pat. No. 3,928,054.

While the high density asbestos reinforced calcium silicate hydrate thermal insulations have proved to be highly effective for many years, recent questions raised regarding the health aspects of asbestos fiber make it desirable to provide an asbestos-free high density calcium silicate hydrate insulation, which insulation would be comparable in thermal and physical properties to the prior art high density asbestoscontaining insulations.

In pursuit of this goal, an asbestos-free tobermorite matrix insulation containing on the order to 29 to 32 percent by weight wollastonite (based on solids) was placed on the market by Johns-Manville Corporation in 1975. This product initially proved satisfactory in its physical and thermal properties, but continued use in the field showed that it was quite susceptible to cracking after a period of use. Cracking of the material of course destroys its insulating value in the vicinity of each crack.

In addition, it is desirable to have an asbestosfree tobermorite calcium silicate hydrate insulation, for production of a xonotlite matrix requires significantly more severe reaction conditions of pressure, temperature and indurating time than production of a tobermorite matrix, as the above patents such as U.S. Pat. No. 3,501,324 evidence, and thus is not economically practical in many instances. Consequently, if there could be full substitution of wollastonite for asbestos in the high density tobermorite products and one did not have to obtain xonotlite to fully utilize wollastonite, high density calcium silicate hydrate reinforced product production would be significantly enhanced.

SUMMARY OF THE INVENTION

The invention herein is an asbestos-free crackresistant thermal insulation body formed by slurrying a mixture consisting essentially of, in parts by weight: 15 to 35 parts of lime, 15 to 35 parts of a siliceous component, 40 to b 70 parts of wollastonite, and 1 to 10 parts of organic fiber, and where the wollastonite content is at least 40 percent by weight of the total weight of solids, said mixture containing no asbestos fiber and having the lime and silica present in a ratio suitable for the formation of tobermorite, in at least one part by weight water per part by weight of said mixture; molding the slurry to a shape-retaining body having a density of at least 20 pcf;

and thereafter curing the molded body in an atomosphere of steam at elevated pressure for sufficient time to cause the lime, siliceous component and water to react to form a tobermorite hydrated calcium silicate matrix reinforced by said wollastonite. In various embodiments the mixture also contains up to 15 parts by weight synthetic inorganic fiber and/or up to 20 parts by weight perlite. It is preferred that the body be molded to a density of at least 35 pcf. In further embodiments the cured body may be laminated to various facings or veneers for appearance or surface treating purposes.

DETAILED DESCRIPTION AND PREFERRED EMBODIMENTS

The principal components of the present insulating composition are lime, silica, wollastonite and a small amount of organic fiber. The lime may be any suitable hydrated lime or quicklime. The lime will be present as from 15 to 35 parts by weight of the mixture of dry solids and preferably about 15 to 25 parts by weight of the mixture.

The siliceous component of the mixture may be any of a wide variety of substantially pure sources of silica. These may include silica, diatomite and similar materials. The siliceous component will be present as from 15 to 35 parts by weight of the mixture, preferably 15 to 25 parts by weight. (Hereinafter the siliceous component will often be referred to as "silica" for brevity. It will be understood, however, that this abbreviated term is not meant to be limiting.)

Particle size and degree of purity of the lime and siliceous components will be substantially the same as those lime and siliceous components used in the past for asbestosreinforced calcium silicate materials.

The lime and silica will be present in a ratio of 0.50 to 1.1 parts of lime per part by weight of silica. Preferably, however, the lime and silica will be present in a ratio within the range of 0.6 to 1.0 parts by weight of lime per part by weight of silica. Under the conditions of reaction described below tobermorite is formed essentially exclusively. If the silica is present in excess over the 1.1:1 ratio, some silica will remain unreacted and/or significant amounts of other calcium silicate hydrate crystalline phases, including xonotlite, may be formed.

The critical third ingredient of the present thermal insulation composition is wollastonite, which is a fibrous crystalline form of anhydrous calcium silicate often referred to by the formula $CaSiO_3$. In the novel tobermorite compositions herein the wollastonite is present as from 40 to 70 parts by weight of the dry mixture. In addition, it is critical to the crack-resistant properties of the insulations of this invention that the wollastonite be present in at least 40 percent by weight, preferably at least about 50 percent by weight, of the total solids. This is a complete departure from the prior art materials where wollastonite could be used by itself only in a xonotlite matrix and required the presence of large amounts of asbestos for satisfactory inclusion in a tobermorite matrix. It is also a major departure from the Johns-Manville product described above in that the wollastonite in the present material is the major and generally predominant component. Neither have such large quantities of wollastonite heretofore been used in a calcium silicate matrix.

The insulation body will also contain, in addition to the lime, silica and wollastonite, 1 to 10 parts by weight, preferably 4 to 8 parts by weight, or organic fiber. The organic fiber may be kraft fiber, newsprint fiber, polyester, cotton or the like. The purpose of the organic fiber is to provide "green strength" to the molded body prior to its being cured by steam induration and also to provide stress distribution during drying and curing In one embodiment the dry mixture may also contain up to 20 parts by weight of synthetic inorganic fiber, such as mineral wool and/or glass fiber, but not including asbestos fiber (which is a natural mineral fiber). The synthetic inorganic fiber provides a measure of "green strength" and permits reduction in the amount of kraft fiber or other organic fiber required. The synthetic inorganic fiber also provides a degree of dry reinforcement of the tobermorite calcium silicate hydrate matrix at elevated temperatures.

In another embodiment the dry mixture also contains up to 20 parts by weight, and preferably 5 to 15 parts by weight, of perlite. The perlite serves as a lightweight aggregate and permits up to about 10% reduction in each of the lime and silica contents.

Any of the additional components, the synthetic inorganic fibers or perlite, may be present alone or in various combinations.

The insulating body of the present invention is made by forming an aqueous slurry of the lime, silica, wollastonite and organic fibers and any of the other desired dry components (but, or course, no asbestos). The slurry will contain at least one part by weight by weight per part of dry mixture of solids. The particular ratio of water-to-solids will depend on the type of molding process used. Where a "Magnani" molding machine is to be used, the ratio would be about 1:1 or slightly higher. A press mold would usually require a ratio in the range of 2:1 to 6:1 while a Fourdrinier machine would require about 5:1 to 10:1. This slurry is mixed for several minutes to disperse the dry solids thoroughly throughout the slurry. Thereafter the slurry is molded to the desired shape, and enough water is expressed from the slurry to leave a shaperetaining molded body having a density of at least 20 pcf (0.3 g/cm$^3$) and preferably at least 35 pcf (0.56 g/cm$^3$). Normally density will be in the range of 35 to 80 pcf (0.56 to 1.28 g/cm$^3$). Typically such a shape is a flat board having a width of from 2 to 4 feet (60 to 120 cm), a length of from 2 to 16 feet (60 to 500 cm) and a thickness of from ½ to 2 inches (1.2 to 5 cm).

The molded board is then placed in an indurating unit, such as an autoclave, where it is cured in the presence of high pressure saturated steam to cause substantially all of the lime and silica to react in the presence of the remaining water to form a tobermorite calcium silicate hydrate matrix throughout the entire board. Steam indurating is dependent on both time and temperature, and normally follows the "rule of thumb" that a 10° C. (18° F.) rise in temperature doubles the reaction rate. Minimum parameters for indurating of the products of this invention would be 8 hours in saturated steam at 100 psig (338° F.; 6.8 atmg, 170° C.). Variations can be made in either or both time and temperature according to the above "rule of thumb." Induration periods of 15–20 hours at 100 psig (6.8 atmg) saturated steam have proved quite satisfactory. Pressures over 200 psig (13.6 atmg) and induration periods over 20 hours are to be avoided, however, for the more severe conditions favor the formation of xonotlite, and such formation defeats the purpose of this invention.

The molded bodies thus cured are high strength, high density, asbestos-free, crack-resistant, non-combustible tobermorite thermal insulations, which have been found to provide significant thermal insulation and fire resistance for such uses as ship bulkheads, oven walls and the like.

In a typical example, a dry mixture comprising approximately 22 weight percent hydrated lime, 22 weight percent silica, 50 weight percent wollastonite, and 6 weight percent kraft fiber, was slurried in 5 parts water per part of dry mixture. This was then molded in a pressure mold at a pressure of 1400 psi (98 kg/cm$^2$) to form a board 4 ft wide by 8 ft. long by 1 inch thick (120 cm × 240 cm × 2.5 cm) and having a density of approximately 46 pcf (0.74 g/cm$^3$). The molded board was then autoclaved in the presence of steam for 20 hours at a saturated steam pressure of 100 psig (338° F.; 6.8 atmg, 170° C.). Following curing and drying the board was found to have a moisture content of approximately 1%, a modulus of rupture of approximately 850 psi (60 kg/cm$^2$), a length and width shrinkage after 5 hours at 1200° F. (650° C.) of less than 0.8% in each direction. The crystalline matrix was entirely tobermorite.

In another typical example, a dry mixture containing 17 weight percent hydrated lime, 17 weight precent silica, 60 weight percent wollastonite and 6 weight percent kraft fiber was slurried in 3 parts water per part of dry mixture. This was then molded in a pressure mold at a pressure of 1800 psi (127 kg/cm$^2$) to form a board 4 ft. wide by 8 ft. long by 1 inch thick (120 cm × 240 cm × 2.5 cm) and having a density of approximately 65 pcf (1.04 g/cm$^3$). The molded board was then autoclaved in the presence of steam for 20 hours at a saturated steam pressure of 100 psig (338° F.; 6.8 atmg, 170° C.). Following the curing and drying the board was found to have a moisture content of approximately 1%, a modulus of rupture of approximately 1500 psi (105 kg/cm$^2$), a length and width shrinkage after 5 hours at 1200° F. (650° C.) of less than 0.8% in each direction. The crystalline matrix was entirely tobermorite.

What is claimed is:

1. A high density asbestos-free tobermorite thermal insulation body formed by slurrying a mixture consisting essentially of, in parts by weight: 15 to 35 parts lime, 15 to 35 parts by weight of a siliceous component, 40 to 70 parts by weight wollastonite, and 1 to 10 parts of organic fiber, and where the wollastonite content is at least 40 percent by weight of the total weight of solids, said mixture containing no asbestos fiber, in at least one part by weight water per part by weight of dry solids in said mixture; molding the slurry to a shape-retaining body having a density of a least 20 pcf; and thereafter curing said molded body in an atmosphere of steam at elevated pressure for a sufficient time to cause the lime, siliceous component, and water to form a tobermorite calcium silicate hydrate matrix reinforced by said wollastonite.

2. A thermal insulation as in claim 1, wherein said mixture further consists essentially of up to 20 parts by weight of synthetic inorganic fiber.

3. A thermal insulation as in claim 1, wherein said mixture further consists essentially of up to 20 parts by weight of perlite.

4. A thermal insulation as in claim 1 wherein said organic fiber is a kraft fiber, newsprint fiber, polyester, or cotton.

5. A thermal insulation as in claim 1 having a density of at least 35 pcf.

6. A thermal insulation as in claim 5 having a density of 35 to 80 pcf.

* * * * *

UNITED STATES PATENT AND TRADEMARK OFFICE
CERTIFICATE OF CORRECTION

PATENT NO. : 4,111,712

DATED : September 5, 1978

INVENTOR(S) : Walter George Pusch

It is certified that error appears in the above–identified patent and that said Letters Patent are hereby corrected as shown below:

Column 2, line 31 "asbestoscontaining" should read --asbestos-containing--.

Column 2, line 33 "to" first occurrence should read -- of --.

Column 2, line 43 "asbestosfree" should read --asbestos-free--.

Column 2, line 57 "crackresistant" should read --crack-resistant--.

Column 2, line 61 following "to" delete "b".

Column 3, line 34 "asbestosreinforced" should read --asbestos-reinforced--.

Column 3, line 67 "or" should read --of--.

Column 4, line 4 following "curing" should be a period.

Column 4, line 27, "by weight" second occurrence should read --of water--.

Column 4, line 38, "shaperetaining" should read --shape-retaining--.

Signed and Sealed this

Eighth Day of May 1979

[SEAL]

Attest:

RUTH C. MASON
Attesting Officer

DONALD W. BANNER
Commissioner of Patents and Trademarks